United States Patent [19]

Busse et al.

[11] Patent Number: 4,656,812
[45] Date of Patent: Apr. 14, 1987

[54] METHOD OF PRODUCING ROUND BALES OF AGRICULTURAL PRODUCTS

[75] Inventors: Winfried Busse, Harsewinkel; Theodor Freye, Gutersloh; Karl H. Tooten, Harsewinkel; Gerhard Clostermeyer, Gütersloh, all of Fed. Rep. of Germany

[73] Assignee: Claas Ohg, Harsewinkel, Fed. Rep. of Germany

[21] Appl. No.: 766,812

[22] Filed: Aug. 16, 1985

[30] Foreign Application Priority Data

Aug. 25, 1984 [DE] Fed. Rep. of Germany ....... 3431389

[51] Int. Cl.[4] ..................... B65B 63/04; A01D 91/00
[52] U.S. Cl. ........................................ 53/399; 53/118; 53/587; 56/341
[58] Field of Search ................ 53/118, 587, 399, 409, 53/436; 56/341

[56] References Cited

U.S. PATENT DOCUMENTS

| 4,057,954 | 11/1977 | Mast | 56/341 |
| 4,514,969 | 5/1985 | Moosbrucker et al. | 56/341 |
| 4,517,891 | 5/1985 | Henry | 56/341 |
| 4,534,285 | 8/1985 | Underhill | 56/341 |
| 4,580,398 | 4/1986 | Bruer et al. | 53/118 |

FOREIGN PATENT DOCUMENTS 2634638 2/1978 Fed. Rep. of Germany ........ 56/341

Primary Examiner—Lowell A. Larson
Assistant Examiner—Donald R. Studebaker
Attorney, Agent, or Firm—Michael J. Striker

[57] ABSTRACT

A method of producing bales of agricultural products includes wrapping a bale with a wrapping material, discharging the fully wrapped bale from the press, and forming a new bale, with an intermediate storage of the product in the press retained as short as possible by overlapping of some of the method steps, so that the time required from the beginning of wrapping of a finished bale to the beginning of forming a new bale is very short.

2 Claims, 2 Drawing Figures

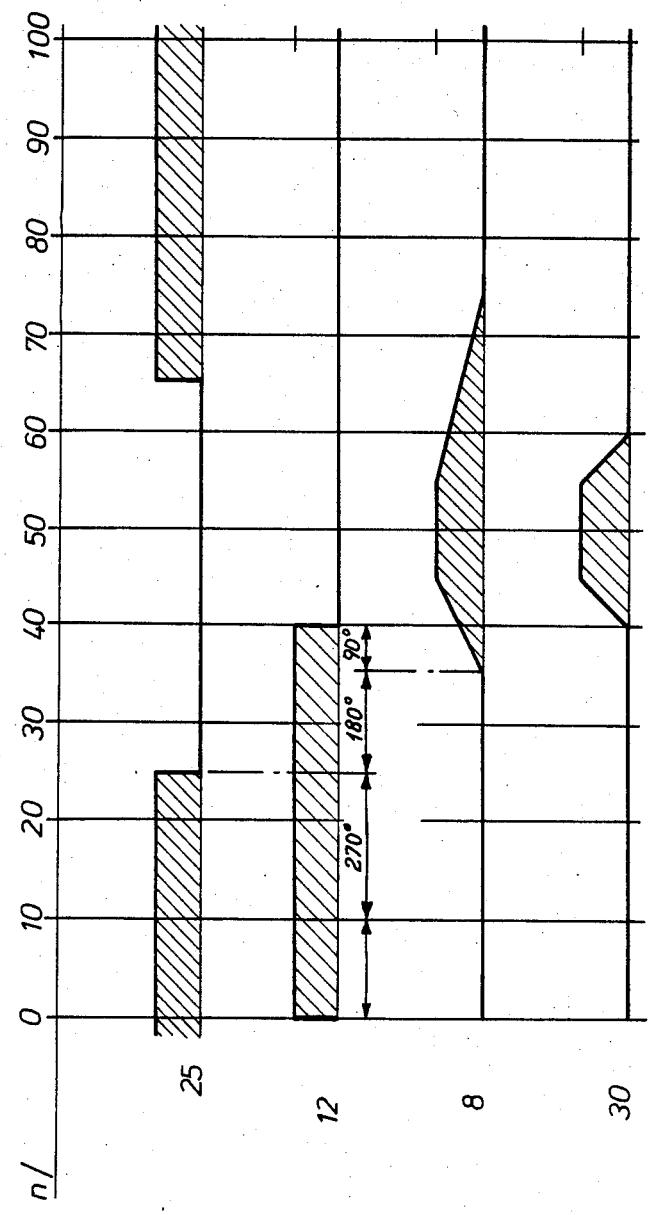

METHOD OF PRODUCING ROUND BALES OF AGRICULTURAL PRODUCTS

BACKGROUND OF THE INVENTION

The present invention relates to a method of producing round bales of agricultural products, which includes wrapping of the bales with a wrapping material in form of foil, net and the like and discharging the completely wrapped bales from a pressing chamber of a round bale press.

The methods of the abovementioned general type are known in the art. In accordance with the known methods a product stream is continuously supplied through a front inlet opening of the press and intermediately stored during the wrapping step, the transporting of the product to the pressing chamber is interrupted, the rotation of the bale is performed in direction toward the upper pressing chamber limit as seen in direction from an inlet opening of the pressing chamber, and after the complete wrapping of the bale the wrapping material is cut off, then the tail cover is opened and the finished wrapped bale is discharged. At the closing of the tail cover the intermediately stored product and the continuously supplied product stream are transported into the pressing chamber for forming a new bale. For maintaining a continuous operation of the press in such methods, the pre-chamber of the press must be formed so big that during wrapping of one finished bale with a wrapping material and expelling the wrapped bale, the continuously supplied agricultural products can be unobjectionably stored in the pre-chamber. This intermediately stored product is transported, after expelling the bale from the press, together with the continuously supplied product stream to the pressing chamber. As has been recognized from practice, frequently accumulation of the material before the inlet gap in the pressing chamber takes place and must be removed manually, which leads to undesirable stoppage of the press. The reason for this phenomenon is that the intermediately stored product quantity is too big to be transported within a short time together with the continuous product stream through a relatively small inlet gap in the pressing chamber.

SUMMARY OF THE INVENTION

Accordingly, it is an object of the present invention to provide a method of producing bales of agricultural products, which avoids the disadvantages of the prior art.

More particularly, it is an object of the present invention to provide a method of producing wrapped bales of agricultural products in which the quantity of product to be intermediately stored is maintained as small as possible.

In keeping with these objects and with others which will become apparent hereinafter, one feature of the present invention resides, briefly stated, in a method of producing wrapped bales, which includes supplying a product through a front inlet opening of the press, transporting the product into the pressing chamber, forming a bale in the pressing chamber, wrapping the bale, intermediately storing the product during the wrapping, opening the pressing chamber, discharging the wrapped bale from the pressing chamber, closing the pressing chamber and again transporting the intermediately stored product and the continuously supplied product stream for forming a new bale in the pressing chamber, wherein in accordance with the invention at least some of the above listed steps overlap in time one another.

In accordance with another advantageous feature of the present invention in dependence on the size of a bale, the wrapping starts during the supply of the product into the pressing chamber, and the product supply into the pressing chamber is interrupted first after wrapping of the bale over a predetermined wrapping angle, and approximately by the time of the complete wrapping shortly before the separation of the wrapping material, the opening of the pressing chamber takes place and the wrapped bale is discharged. Simultaneously with the subsequent closing of the pressing chamber, the transportation of the intermediately stored product and the continuously supplied product into the pressing chamber takes place.

In accordance with still another advantageous feature of the present invention, the closing of the pressing chamber starts in response to sensing of the discharged bale by a sensor, such as for example, a sensing plate.

When the method is performed in accordance with the present invention the time period between the beginning of wrapping of a bale after its formation and the formation of a new bale is maintained as small as possible and thereby only a small quantity of product can be intermediately stored and the danger of the accumulation of the product no longer takes place.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 is a view showing a block diagram for time periods during wrapping of the bale in the press in accordance with FIG. 1.

DESCRIPTION OF THE PREFERRED EMBODIMENTS

Figure 1:
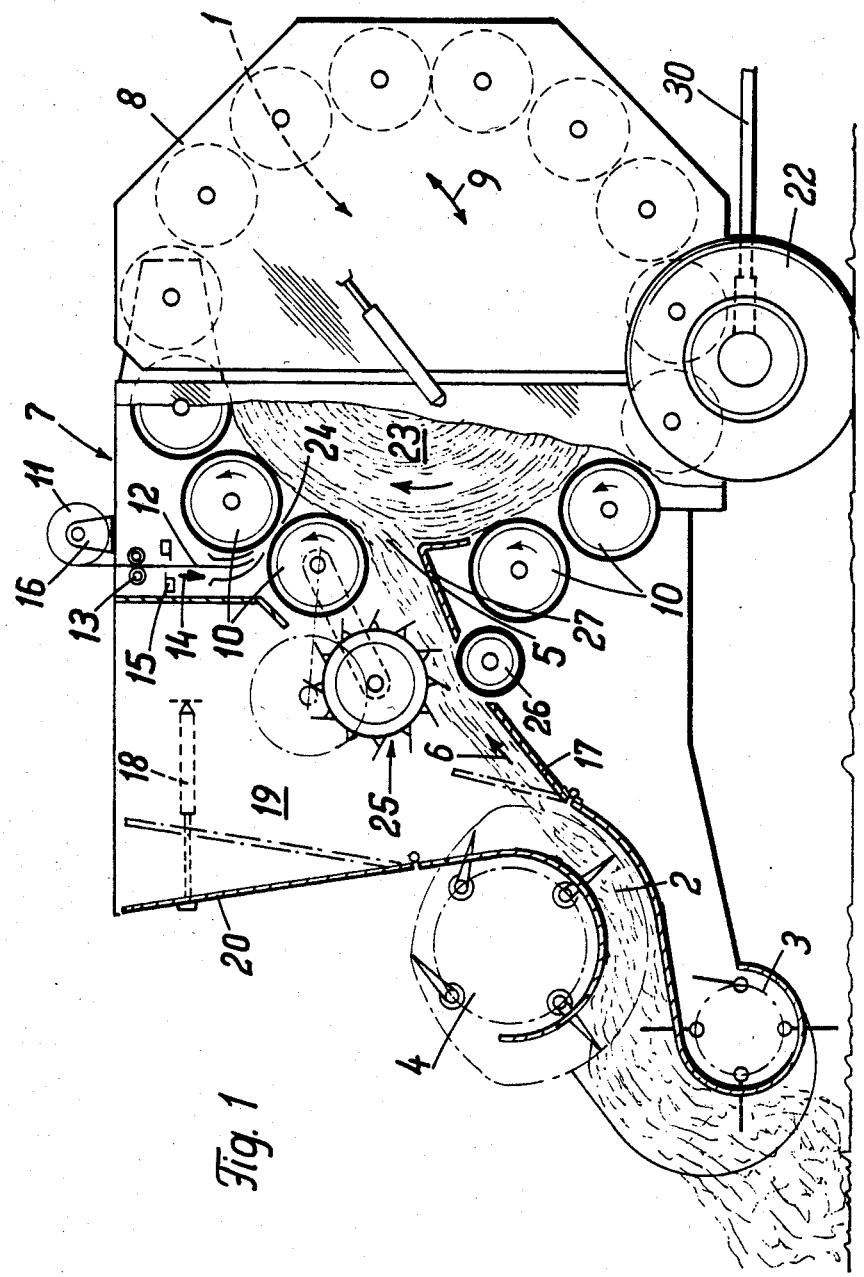
FIG. 1 is a side view of a round bale press in accordance with the present invention, partially in section.

A baling press is provided with two lateral wheels 22 and has a housing which includes a front fixed housing part 7 and a rear housing part 8 which is turnable upwardly and downwardly relative to the front housing part in direction of the double arrow 9. For discharging a round bale 23, the rear housing part 8 is turned upwardly.

A winding chamber of the press is identified with reference numeral 1 and formed by a plurality of transporting rollers 10 which are arranged after one another over a circle and have parallel axes. At the front side the transporting rollers 10 form a supply gap 5 through which a product 2 can be supplied into the winding chamber 1. The product 2 is picked from the ground by a pickup drum 3 and transported into a throwing region of a transporting drum 25 from which the product is transported through the supply gap 5 into the winding chamber 1.

A guiding plate 27 has at its front region a turnable portion 17. A smooth counter roller 26 is arranged after the portion 17 and associated with a transporting drum 25. The guiding plate 27 in its region located behind the counter roller 26 is formed as a fixed guiding plate. The press has a prechamber with a front wall identified with reference numeral 20. The front wall 20 is turnable about a horizontal axis forwardly or rearwardly, by means of an adjusting element 18.

An inlet 24 is formed above and as close as possible to the supply gap 5. A wrapping material such as for example a net material 12 is introduced through the inlet 24 into the winding chamber 1 when the rolled bale 23 is being rolled. The wrapping material 12 is located on a supply drum 11 which is turnably mounted above the baling press on holders 16. Before the bale 23 is almost completely formed by means of a not shown known mechanism, the wrapping material 12 runs in the direction of the arrow 14 through a counter 13, a separating device 15 and the inlet 24 onto the periphery of the finished rolled bale.

As shown in FIG. 2, this step in the shown example takes the time which approximately corresponds to ten revolutions of the counter. During the further rotation of the bale, the front end of the wrapping material is entrained and reaches after further 15 revolutions of the counter the supply gap 5. At this time point, in which the bale is wrapped by the wrapping material over approximately 270°, the transporting drum 25 is stopped and thereby the supply of the product 2 into the winding chamber is interrupted, the product is intermediately stored in the pre-chamber 19. After a further wrapping of approximately 180° (which corresponds to ten revolutions of the counter) opening of the rear housing part 8 starts. During the opening movement the wrapping material after approximately 5 revolutions of the counter after the beginning of the opening movement is cut off. The bale is turned over further 90°. As long as the housing part 8 is open, the bale rolls onto the ground over a guiding plate 30 which is spring biased. In the moment when the guiding plate 30 reverses its movement and turns upwardly, closing movement of the housing part 8 starts. Before the closing movement is approximately finished, it turns on again the transporting drum 25 so that the product which is continuously supplied and intermediately stored in the pre-chamber 19 can be transported into the winding chamber. As can be seen from FIG. 2, the overlap of individual method steps in accordance with the present invention provides for a considerable time economy.

During use of such a baling press in commercial applications it is especially advantageous, because of frequently changed type of the products to be pressed, to provide a central control device. Depending upon the type of product this central control device can adjust the length of individual method steps. It can be formed as a freely programmable control.

It will be understood that each of the elements described above, or two or more together, may also find a useful application in other types of constructions differing from the types described above.

While the invention has been illustrated and described as embodied in a method of wrapping a harvester product bale, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An improved method of producing round bales of agricultural products wrapped by a wrapping material, with the steps of continuously supplying a product into a press; transporting the product into pressing chamber for forming a bale; wrapping the bale with a wrapping material; intermediately storing the product and interrupting the supply of the product into the pressing chamber during the wrapping step; separating the wrapping material after wrapping of the bale; opening the pressing chamber; discharging the wrapped finished bale out of the pressing chamber; closing the pressing chamber; further transporting the intermediately stored product and the continuously supplied products into the pressing chamber so as to form a new bale wherein the improvement comprises:

starting the opening of the pressing chamber before separating the wrapping material; and starting of the closing of the pressing chamber in response to sensing of the discharged bale during said discharging step by a sensor, and transporting the intermediately stored product and the continuously supplied product into the pressing chamber before the chamber is fully closed.

2. A method as defined in claim 1, wherein said sensing step includes sensing the discharged bale by the sensor formed as a sensing guide actuated by a discharge bale.

* * * * *